United States Patent [19]

Rosencher

[11] Patent Number: 5,311,278
[45] Date of Patent: May 10, 1994

[54] SPECTROMETER

[75] Inventor: Emmanuel Rosencher, Bagneux, France

[73] Assignee: Thomson-CSF, Puteaux, France

[21] Appl. No.: 957,777

[22] Filed: Oct. 8, 1992

[30] Foreign Application Priority Data

Oct. 11, 1991 [FR] France ................ 91 12565

[51] Int. Cl.$^5$ ............................ G01J 3/443
[52] U.S. Cl. ............................ 356/326; 359/245
[58] Field of Search ............ 356/326, 328; 359/245

[56] References Cited

U.S. PATENT DOCUMENTS

| | | |
|---|---|---|
| 3,308,712 | 3/1967 | Kay . |
| 4,394,069 | 7/1983 | Kaye . |
| 4,492,434 | 1/1985 | Bottka et al. . |
| 4,900,113 | 2/1990 | Hatori . |
| 5,086,327 | 2/1992 | Rosencher et al. ........... 357/30 |

FOREIGN PATENT DOCUMENTS

| | | |
|---|---|---|
| 2637092 | 3/1990 | France . |
| 61-277024 | 12/1986 | Japan . |
| 63-044132 | 2/1988 | Japan . |
| 9006596 | 6/1990 | World Int. Prop. O. . |

Primary Examiner—Vincent P. McGraw
Assistant Examiner—K. P. Hantis
Attorney, Agent, or Firm—Oblon, Spivak, McClelland, Maier & Neustadt

[57] ABSTRACT

A light intensity modulator with a predefined range of modulation wavelengths (preferably a narrow range) can be adjusted by a control signal. This modulator receives a light beam and retransmits a modulated light beam in which any wavelength within the modulation range is modulated. A light intensity detector receives this modulated beam and outputs an electrical signal which is a function of the luminous intensity detected. Such a device finds particular application as a spectrophotometer.

6 Claims, 7 Drawing Sheets

SPECTROMETER

BACKGROUND OF THE INVENTION

1. Field of the Invention

The invention is a spectrometer and, more particularly, a solid-state device to analyze the wavelength in an electromagnetic wave (spectrophotometer). In a preferred embodiment of the invention, the device is produced from quantum-well semiconductor materials.

2. Discussion of the Background

Multi quantum-well radiation detectors (MQWRD), using transitions between both captive and free levels and between different captive levels are known to industry. Their operation will now be briefly described.

Figure 1A:
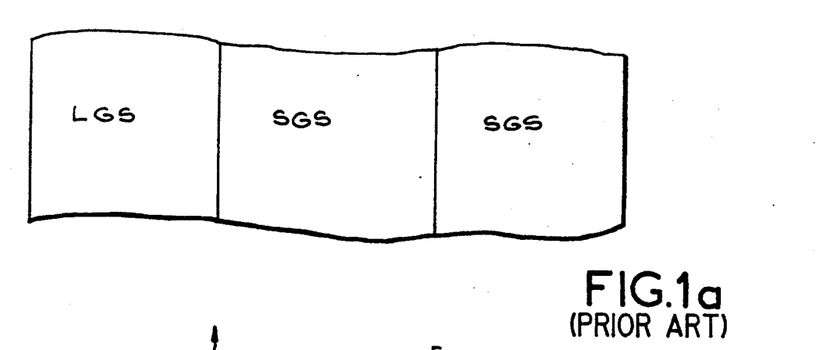

They consist of an alternating stack of small-gap semiconductor (SGS) layers between two large-gap semiconductors (LGS) as shown in FIG. 1a. The energy difference between the lower end of the conductive band of the two semiconductors is the band-offset $\Delta E$. For example, these two semi-conductors can be GaAs for the SGS and $Al_x Ga_{1-x}As$ (where x is between 0 and 1). The electrons in such a structure are exposed to a potential well $\Delta E$ deep and d wide, where d is the thickness of the SGS layer. If the width d is sufficiently small, the electron energy corresponding to movement perpendicular to the layers is quantized in levels $E_1$, $E_2$, etc.

Figure 1B:
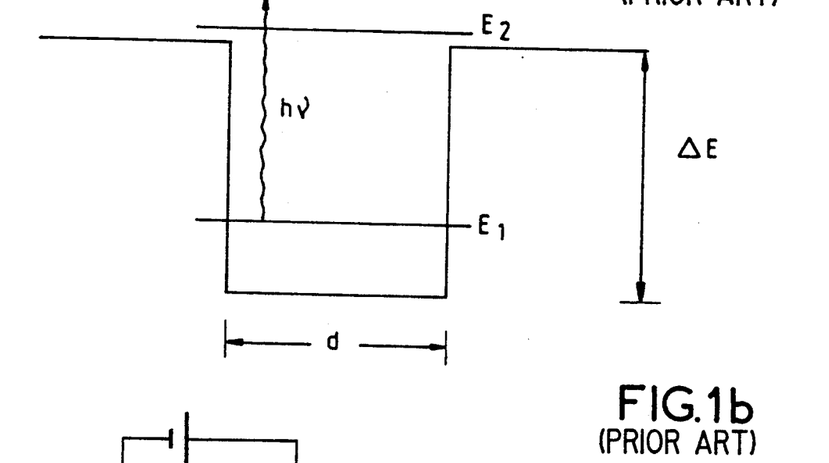
Figure 1C:
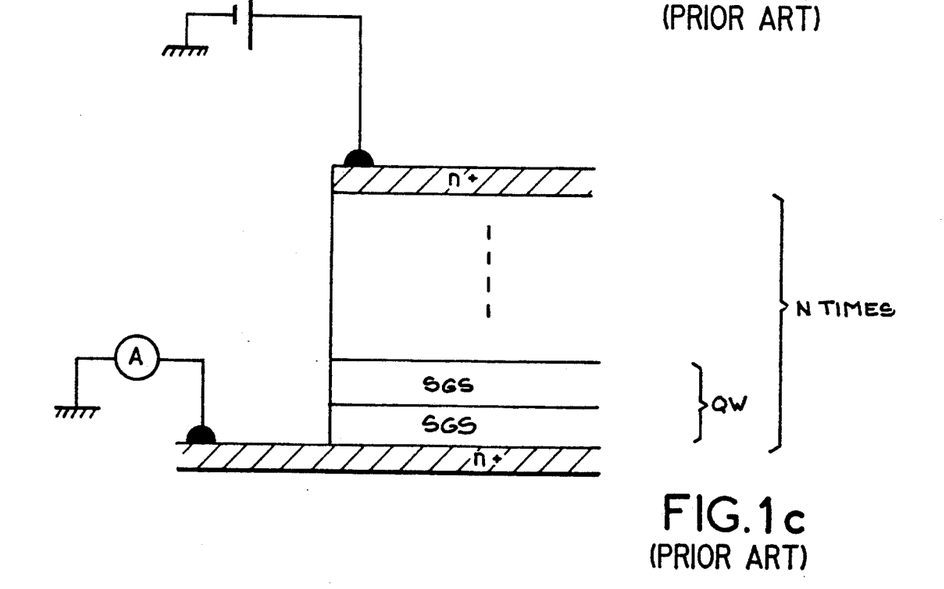

In captive-free photoconductive detectors, level $E_1$ is captive ($E_1 < \Delta E$) and level $E_2$ is free ($E_2 \leqq \Delta E$). If an electron is placed at level $E_1$ (for example by doping), a photon whose energy $h\upsilon$ exceeds $\Delta E - E_1$ will cause an optical transition (see FIG. 1b). The electron is then free to move and can be detected as a current across the terminals of a multi quantum-well (see FIG. 1c).

Figure 2A:
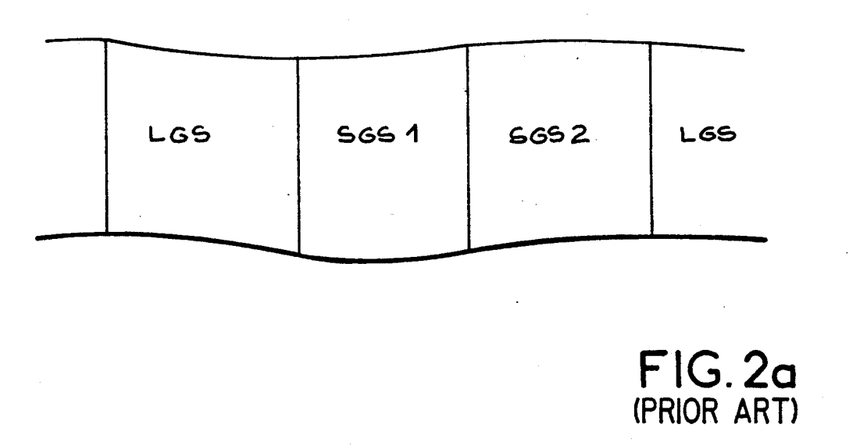
Figure 2B:
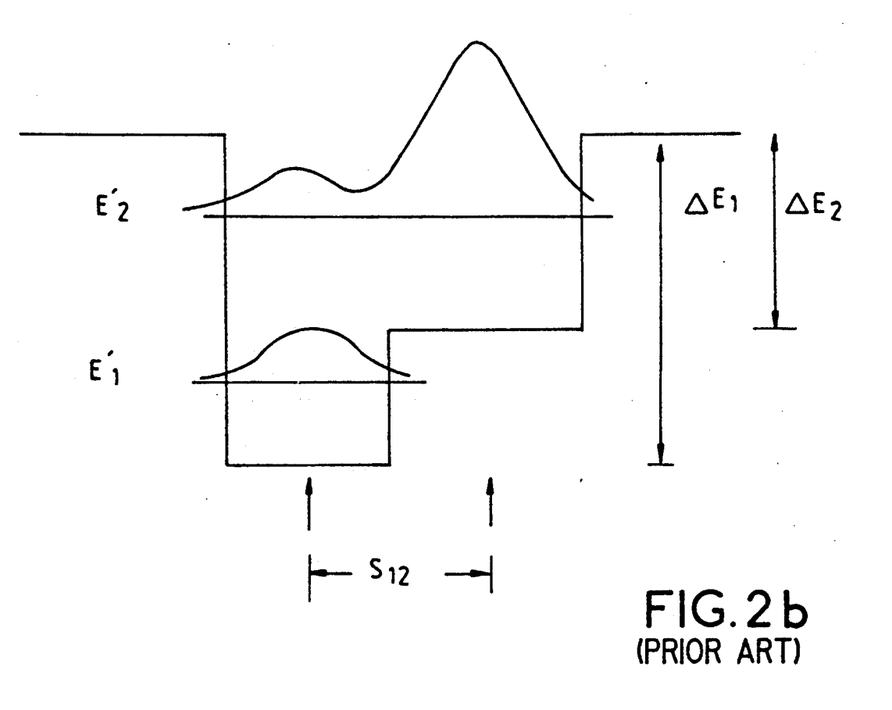

Optical modulators, using asymmetric quantum wells (AQW) are also known to industry. FIGS. 2a and 2b represent an example of an asymmetric quantum well. The quantum well consists of two small-gap semiconductors SGS1 and SGS2 with $\Delta E1 > \Delta E2$. For example, SGS1 can be GaAs and SGS2 can be $Al_x Ga_{1-x}As$. This quantum well is confined between two barriers formed by a large-gap semiconductor (LGS) which can be in $Al_y Ga_{1-y}As$ where y is between 0 and 1 and greater than x.

Figure 2C:
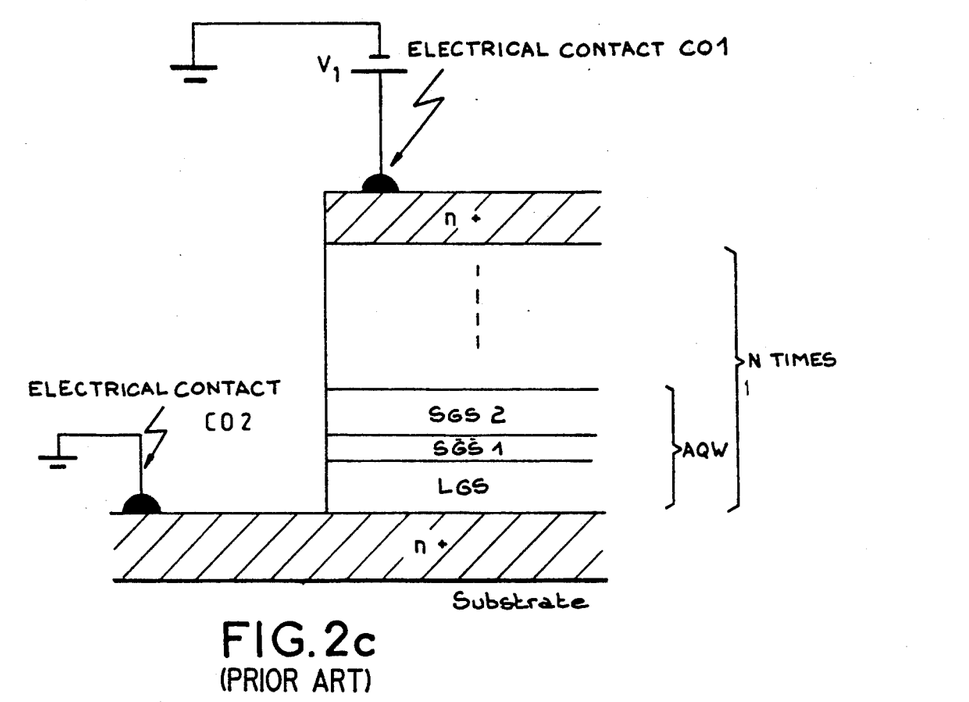

The stacks are produced such that there are at least two captive levels $E'_1$ and $E'_2$ in the well. A photo whose energy $h\upsilon_o = E'_2 - E'_1$ is then absorbed in the well (FIG. 2b). These quantum wells can be stacked to achieve an asymmetric multi quantum well (AMQW) as shown in FIG. 2c.

Figure 3A:
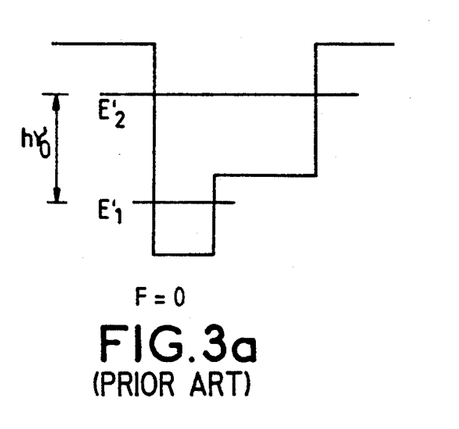
Figure 3B:
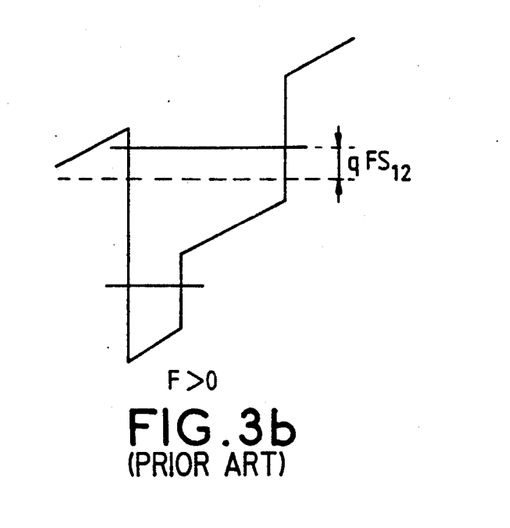

When an electric field F is applied to terminals CO1 and CO2 of the AMQW, the position of levels $E'_1$ and $E'_2$ changes this is the linear STARK effect. The photon resonant wavelength then becomes:

$$h\upsilon(F) = h\upsilon_o + qF\delta_{12}$$

where q is the electron charge and $\delta_{12}$ is the distance between the mean electron positions on level $E'_1$ and level $E'_2$ (see FIG. 3a). The absorption peaks then shift towards higher energies (shorter wavelengths) for $F > 0$ (FIG. 3b) and to lower energies for $F < 0$.

Figure 3C:
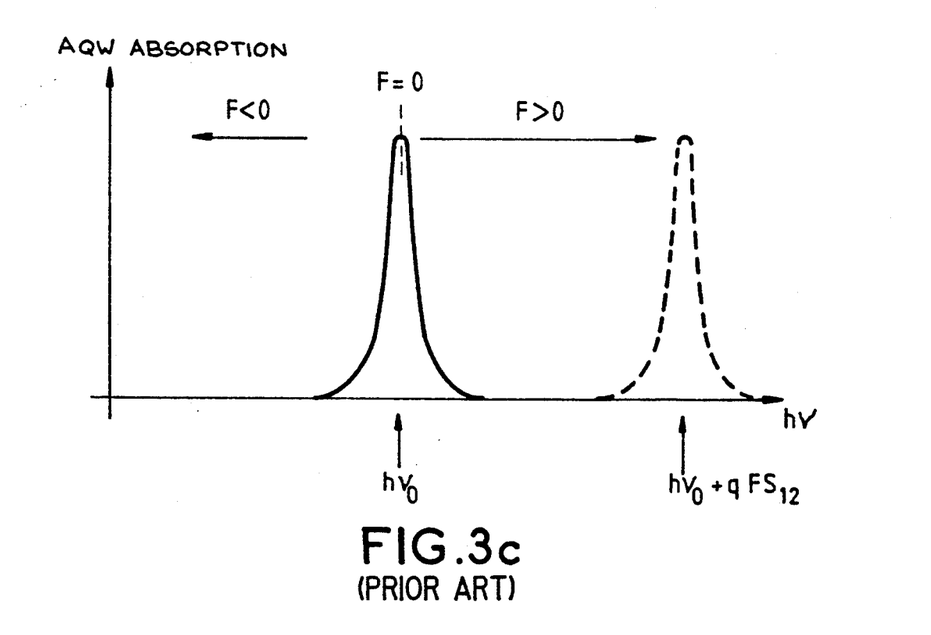

As shown on FIG. 3c, the modulator absorption peak can therefore be shifted part of a given wavelength towards shorter wavelengths ($F > 0$) or longer wavelengths ($F > 0$).

SUMMARY OF THE INVENTION

The present invention is directed to an optical frequency spectrum analyzer which employs known quantum well devices.

The invention is, therefore, a spectrometer which includes:

a luminous intensity modulator with a predefined range of modulation wavelengths, this range being adjustable by a control signal, which receives a light beam and retransmits a light beam, in which the modulator modulates any wavelength contained in the range of modulation wavelengths;

a luminous intensity detector operating over a wide range of wavelengths, which receives the modulated light beam and outputs an electric signal which is a function of the intensity detected.

In such a device, the modulator is a quantum well modulator whose range of modulation wavelengths is controlled by a control voltage. The detector is also a quantum well detector. The detector and modulator are stacked on the same substrate.

BRIEF DESCRIPTION OF THE DRAWINGS

The various purposes and characteristics of the invention will be better understood on reading the following description based on the appended figures of which:

FIGS. 1a to 3c represent devices complying with the prior art and described above;

FIGS. 6a to 6c are diagrams describing the operation of the spectrophotometer shown in FIG. 5a;

DETAILED DESCRIPTION OF THE INVENTION

Figure 4:
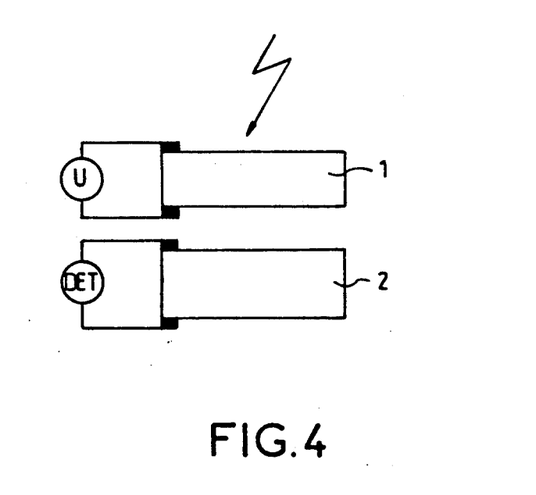
FIG. 4 represents a general example of the embodiment of a spectrophotometer complying with the invention.

We shall first describe, with reference to FIG. 4, a general example of an embodiment of a spectrophotometer complying with the invention. This spectrophotometer includes a luminous intensity modulator 1 which modulates the light over a narrow range of wavelengths (modulation point). Ideally, the modulator is transparent to other wavelengths. Control circuits, such as a voltage source U, are used to apply a control signal to modulator 1 to move its modulation point as required.

A luminous intensity detector 2 is used in conjunction with modulator 1. It receives the light which has passed through the modulator and outputs a signal which is a function of the luminous intensity received; this signal is displayed on a detector device DET.

The following example will help clarify the operation of the invention.

Modulator 1 is illuminated by the beam E to be analyzed. If the modulator 1 modulation point does not correspond to any wavelength in beam E, all the light is transmitted to detector 1 which, therefore, detects the maximum intensity. The control signal then shifts the modulator modulation point. When this point corresponds to a wavelength in beam E, the modulator absorbs all or part of this wavelength and the intensity of the beam transmitted to detector 2 is reduced by an amount corresponding to the intensity absorbed.

Figure 5A:
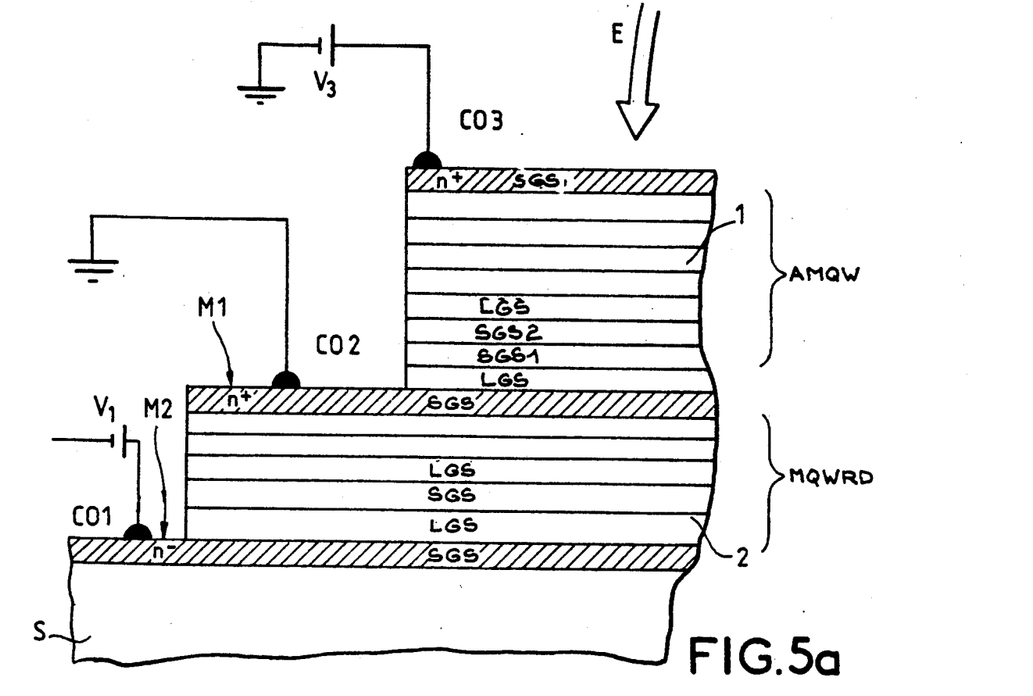
FIGS. 5a and 5b represents a preferred embodiment of a spectrophotometer complying with the invention.
Figure 5B:
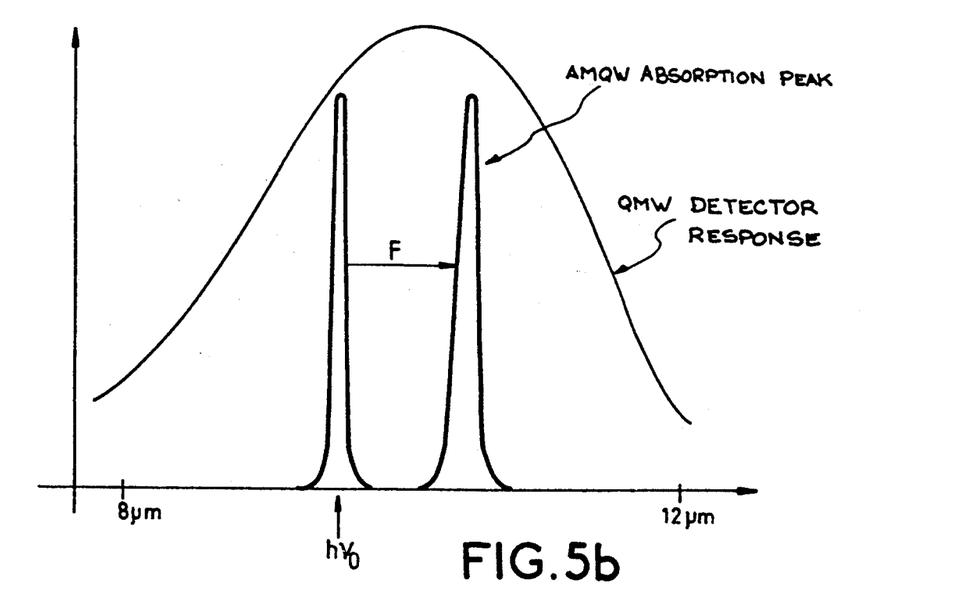

We shall now describe, in reference to FIGS. 5a and 5b, an example of a preferred embodiment of the invention in which modulator 1 and detector 2 are quantum well structures stacked on the same substrate S.

The device therefore consists of substrate S, a stack of doped LGS/SGS/LGS layers forming a multi quantum well radiation detector (MQWRD) 2, trapped between two thick and highly-doped layers of SGS which provide electrical contact and, above one of these layers, a stack of doped layers LGS/SGS1/SGS2/LGS which form asymmetric multi quantum well (AMQW) modulator 1 trapped between two thick and highly-doped layers of SGS forming electrical contacts. Electrical contacts are placed on the bottom contact layer (CO1), the intermediate contact layer between the MQWRD and the AMQW (CO2) and the top contact layer (CO3). The MQWRD is produced to achieve a wide spectrum response, for example from 8 to 12 microns. A voltage $V_1$ is applied across CO1 and CO2 to feed the MQWRD. The AMQW are produced so that the absorption peak at h $v'$ varies between 8 and 12 microns depending on the applied voltage V3 (FIG. 5b).

The photon flux $\phi_D$ received by the detector is then:

$$\phi_D(hv) = \phi(hv) * [1 - \alpha(hv + qF\delta_{12})]$$

where * indicates the convolution product. The detector response R is then:

$$R_D(hv) = R(hv) * [\phi(hv) * [1 - \alpha(hv^+ + qF\delta_{12})]]$$

Figure 6A:
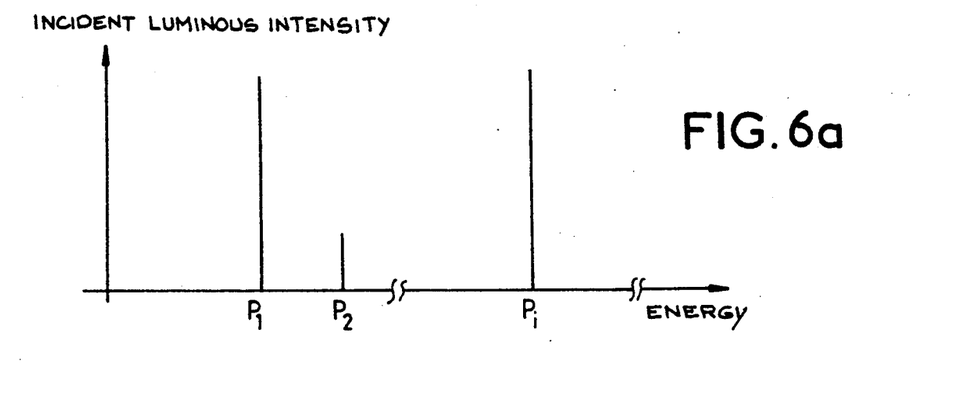
Figure 6B:
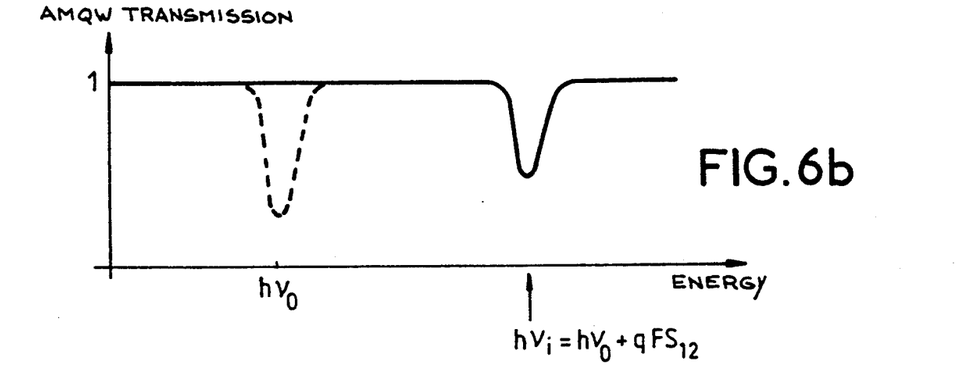

Knowing R (h $v$) and $\alpha$(h $v$), if we measure $R_D$ (h $v$) for various values of F, we can work back to $\phi$(h $v$), i.e. obtain a spectrophotometric analysis of the incident radiation by deconvoluting the previous equation. A particularly simple but important case is when $\phi$(h $v$) is a series of transmission or absorption peaks for a gas, liquid, etc., which occur at energies h $v_i$ (see FIG. 6a). If the electrical field F applied to the AMQW is varied continuously, the absorption peak successively coincides with each incident emission peak (FIG. 6b) for electrical fields defined by:

$$F_i = (hv_i - hv_o) \frac{1}{q\delta_{12}}$$

Figure 6C:
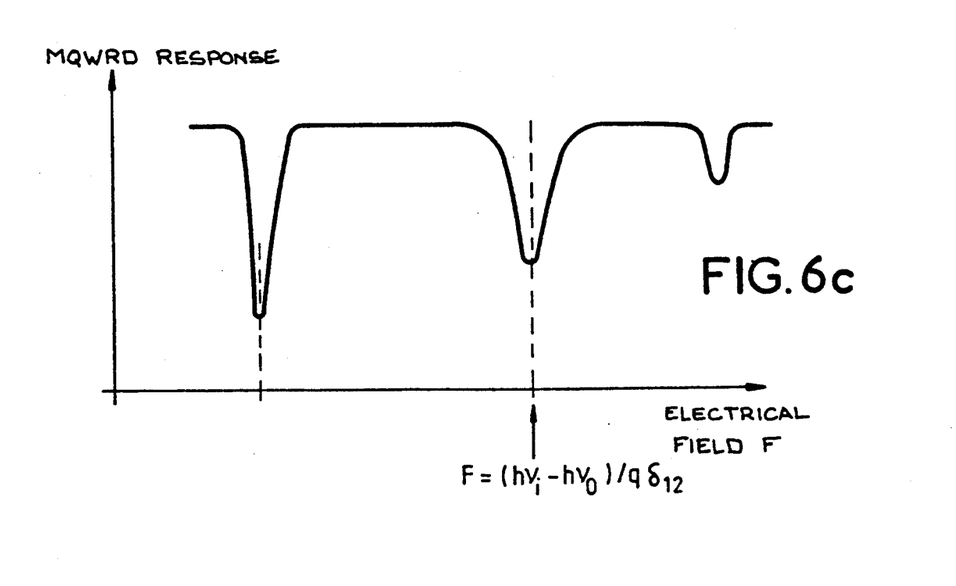

The response of the MQWRD, which includes, for example, all peaks between 8 and 12 μm, is constant except when the potential applied across the terminals of the AQW satisfies this equation. The response then contains minima for each $F^i_{AMQW}$ (FIG. 6c). We have therefore achieved a spectrophotometric analysis by varying a voltage applied to the modulator. The device is, therefore, a solid-state, or even microscopic, spectrophotometer. The spectrophotometric contrast can be increased using a synchronous detection method.

Figure 7A:
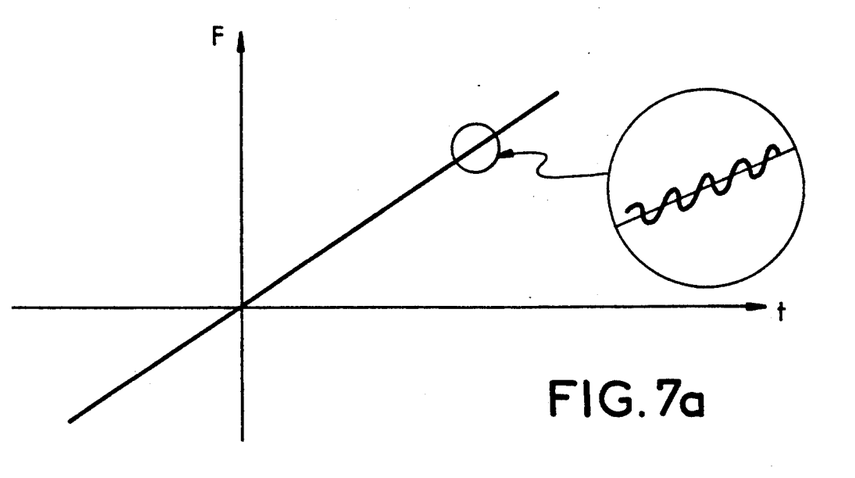
FIGS. 7a and 7b are diagrams representing the operation of a spectrophotometer complying with the invention when controlled by a modulated voltage signal.

The electric field applied is varied slowly and an AC modulation is superimposed on this voltage (by circuits not shown) (FIG. 7a). The current generated in the MQWRD is then synchronously detected. It is known that the signal obtained is the derivative of the signal obtained in the previous static measurement.

Figure 7B:
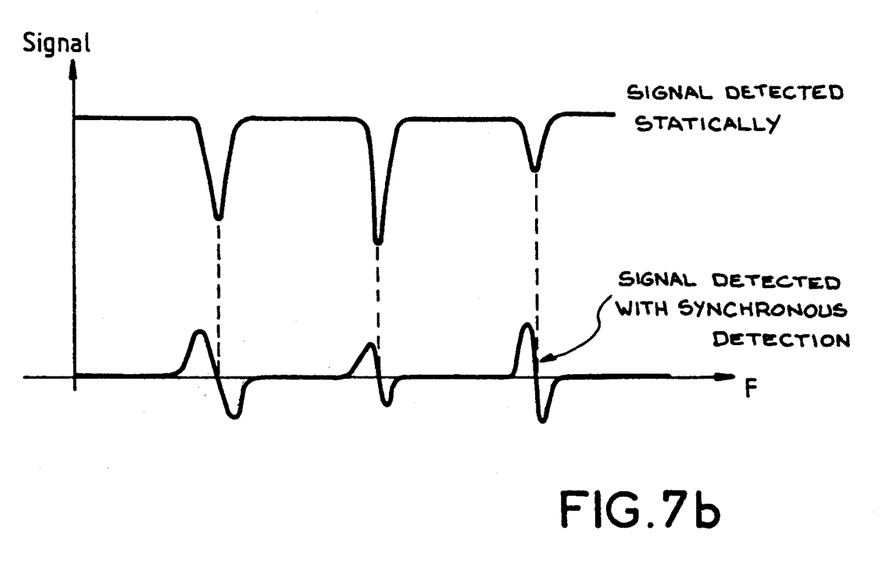

The signal will, therefore, only be non-zero close to the peaks, thus increasing the contrast (FIG. 7b).

We shall now describe a proposed embodiment of the device. The device is produced by an epitaxic deposit technique, complying with the prior art, such as molecular jet epitaxy. Starting with a GaAs wafer, 0.5 μm of GaAs$-$n+ is deposited (doped at $10^{18}$ cm$^{-3}$) followed by 100 GaAs (4 nm) and Al$_{0.29}$Ga0.$_{71}$ As (30 nm) quantum wells doped in the wells to $10^{18}$ cm$^{-3}$. This produces the detector. Such a detector will respond between 8 and 12 μm. An electrical contact of 0.5 μm of GaAs$-$n+ is then grown and 100 dissymetric quantum wells are then produced again by epitaxy: GaAs (3.2 nm), Al$_{0.2}$ Ga$_{0.8}$ As (6.7 mm) and Al$_{0.35}$Ga0$_{0.65}$As (30 nm). The two energy levels E'$_1$ and E'$_2$ are separated by 120 meV (10.6 μm). Distance $\delta_{12}$ between the barycenters of these two states is 4.5 nm. Because the electrical field applicable to such structures is approx +50 kV/cm, the absorption peak can be varied between $\pm$qF $\delta_{12}$, i.e. +22.5 meV on either side of the peak at F=0, i.e. from 9 μm to 13 μm. This structure is completed by a 0.5 μm deposit of GaAs$-$n+. A small mesa is produced, using prior art techniques, down to the intermediate GaAs$-$n+ electrical contact (to M1 on FIG. 5a) and then a second is etched down to the bottom GaAs$-^{n+}$ electrical contact (i.e. to M2 on FIG. 5a). Contact electrodes, such as AuGeNi, are bonded to the electrical contact layers by prior art techniques. The sample produced in this way has all the properties required to produce a spectrophotometer.

As a variant on the invention, a detector produced from a different detection material, such as HgCdTe, could be used. The disadvantage of such a structure would be that the detector and the AMQW would have to be aligned by bonding or by another mechanical method. The advantages would lie in the higher operating temperatures possible with such a system since HgCdTe-based detectors have a greater detection range than MQW-based detectors.

What is claimed is:
1. A spectrometer comprising:
   a substrate;
   a first layer of small-gap semiconductor material formed on the substrate;
   a first stack of layers comprising a plurality of large-gap semiconductor layers and small-gap semiconductor layers formed on the first layer of small-gap semiconductor material;
   a second layer of small-gap semiconductor material formed on the first stack of layers, wherein the first layer of small-gap semiconductor material, the first stack of layers and the second layer of small-gap semiconductor material form a luminous intensity detector for outputting an electrical signal as a function of an input light signal;
   a second stack of layers comprising a plurality of large-gap semiconductor layers and small-gap semiconductor layers formed on the second layer of small-gap semiconductor material, wherein the second stack of layers comprises first and second layers of small-gap semiconductor materials with respective first and second small-gaps of different values; and
   a third layer of small-gap semiconductor material formed on the second stack of layers, wherein the second layer of small-gap semiconductor material, the second stack of layers and the third layer of small-gap semiconductor material form a luminous intensity modulator having a range of modulation wavelength adjusted by a control signal, and for receiving a light signal and retransmitting a modu- lated light signal to the luminous intensity detector as the input light signal.

2. The spectrometer according to claim 1, wherein the large-gap semiconductor layers and small-gap semiconductor layers of the first stack of layers are alternating.

3. The spectrometer according to claim 1, wherein the first layer of small-gap semiconductor material is doped negatively and the second layer of small-gap semiconductor material is doped positively.

4. The spectrometer according to claim 3, wherein the third layer of small-gap semiconductor material is doped positively.

5. The spectrometer according to claim 1, wherein in the second stack of layers, the large-gap semiconductor layers comprises $Al_yGa_{1-y}As$, where $0<Y<1$, the first layer of small-gap semiconductor material comprises GaAs and the second layer of small-gap semiconductor material comprises $Al_xGa_{1-x}As$, where $0<x<1$, and $x<y$.

6. The spectrometer according to claim 1, wherein the substrate comprises GaAs, the small-gap semiconductor layers of the first stack of layers comprise GaAs and the large-gap semiconductor layers of the first stack of layers comprise $Al_yGa_{1-x}As$, where $0<X<1$.

* * * * *